(12) United States Patent
Rezeanu

(10) Patent No.: US 7,173,469 B1
(45) Date of Patent: Feb. 6, 2007

(54) CLOCKING SYSTEM AND METHOD FOR A MEMORY

(75) Inventor: Stefan-Cristian Rezeanu, Colorado Springs, CO (US)

(73) Assignee: Cypress Semiconductor Corp., San Jose, CA (US)

( * ) Notice: Subject to any disclaimer, the term of this patent is extended or adjusted under 35 U.S.C. 154(b) by 722 days.

(21) Appl. No.: 10/057,196

(22) Filed: Jan. 24, 2002

(51) Int. Cl.
*G06F 1/04* (2006.01)

(52) U.S. Cl. ........................ 327/291; 327/293

(58) Field of Classification Search ................ 327/291, 327/293, 295, 299, 202, 175, 239, 261, 269, 327/276
See application file for complete search history.

(56) References Cited

U.S. PATENT DOCUMENTS

| | | | |
|---|---|---|---|
| 4,919,739 A * | 4/1990 | Dyksterhouse et al. ..... | 156/181 |
| 5,379,263 A | 1/1995 | Ogawa et al. .......... | 365/230.04 |
| 5,617,368 A | 4/1997 | Ishida ........................ | 365/221 |
| 5,825,713 A | 10/1998 | Lee ......................... | 365/230.05 |
| 5,949,721 A | 9/1999 | Kwon et al. ............ | 365/189.11 |
| 6,160,742 A | 12/2000 | Chung et al. .......... | 365/189.05 |
| 6,167,487 A | 12/2000 | Camacho et al. ........... | 711/131 |
| 6,278,637 B1 * | 8/2001 | Kawaguchi ............ | 365/189.05 |
| 6,380,785 B2 * | 4/2002 | Fisher ......................... | 327/269 |
| 6,452,433 B1 * | 9/2002 | Chang et al. ............... | 327/202 |
| 6,757,327 B1 * | 6/2004 | Fiedler ........................ | 375/232 |

FOREIGN PATENT DOCUMENTS

EP 1324346 A1 * 7/2003

* cited by examiner

*Primary Examiner*—Timothy P. Callahan
*Assistant Examiner*—Cassandra Cox
(74) *Attorney, Agent, or Firm*—Dale B. Halling

(57) ABSTRACT

A clocking system for a memory that accomplishes these and other objectives has an external clock. A clock shaper has an input coupled to the external clock and an access clock at an output. A first delay block has an input coupled to the external clock and an output coupled to a master of an output register. A slave of the output register is coupled to the external clock. By having the master clock trailing the slave clock a temporary transparency window condition is created at the output register, allowing an improved cycle time (speed) prime bin distribution.

14 Claims, 5 Drawing Sheets

CLOCKING SYSTEM AND METHOD FOR A MEMORY

FIELD OF THE INVENTION

The present invention relates generally to the field of memories and more particularly to a clocking system and method for a memory.

BACKGROUND OF THE INVENTION

Synchronous type semiconductor memory devices perform read and write operations responsive to an external clock signal. One disadvantage to this type of device is the amount of time it takes for the semiconductor memory device to respond to a read address and transmit the read data stored in the cell to a data output buffer. When the period of the clock signal becomes shorter than the time for the read data to be transmitted to the data output buffer, the read data will not be output to the external device.

The pipeline method of reading data was designed to solve this problem. The pipelined method responds to the read command and outputs the read data transmitted from the memory cell to the data output buffer. From there the data is transmitted to the external device after one cycle of the read command. Unfortunately, the operational advantages of conventional pipelined read methods are limited as clock frequencies are increased. Generally, pipelined memories have a trade between clock-to-data valid times and cycle times. A number of methods have been proposed to reduce one or the other of these two times, but always at the expense of the other time. Generally, memory manufacturers can sell faster memories (clock frequency, cycle time and clock-to-data valid time) for higher prices than slower memories.

Thus there exists a need for a clocking system and method for memories that minimizes the trade between cycle time and clock-to-data valid time and allows for faster clock frequencies.

SUMMARY OF INVENTION

A clocking system for a memory that accomplishes these and other objectives has an external clock. A clock shaper has an input coupled to the external clock and an access clock at an output. A first delay block has an input coupled to the external clock and an output coupled to a master of an output register. A slave of the output register is coupled to the external clock. In one embodiment, there is a second delay block that delays the clock to the slave signal. By having a different delay for the master and the slave sections of the output register a temporary transparency window condition exists. This allows correct data to be latched in the master section of the latch for the slow corner (generally obtained for a slow process and highest operating voltage and temperature), corresponding to an internal cycle time relaxation, while still allowing a fastest possible clock-to-data valid for the typical and fast corners. Thus the cycle time and the clock-to-data valid times are not directly tied to each other, improving the number of slower process devices that still meet both the cycle time and clock-to-data valid time at faster clock frequencies.

DETAILED DESCRIPTION OF THE DRAWINGS

The present invention minimizes the trade between cycle time and clock-to-data valid times for a semiconductor memory. As a result, clock frequencies may be increased. The invention has direct advantages for both synchronous single and multi-port pipeline memories, but is not limited to these memories.

Figure 1:
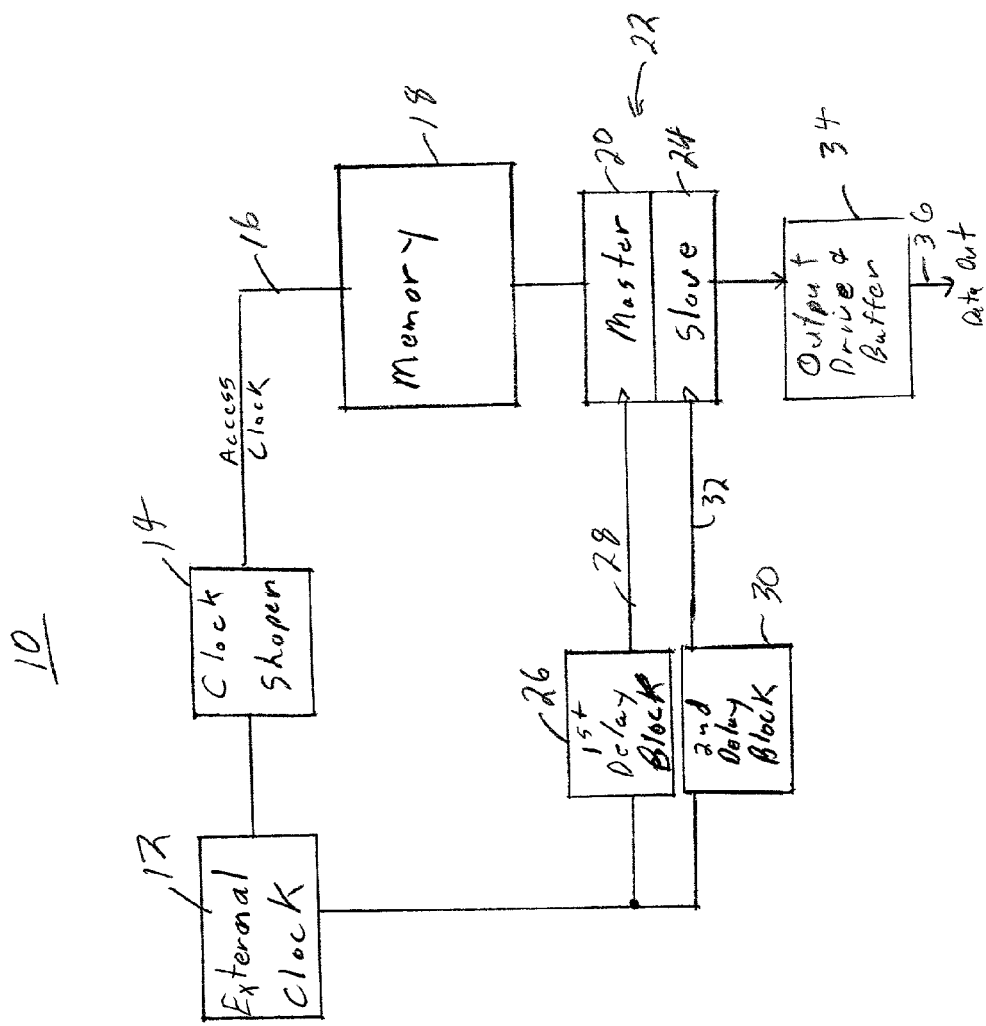
FIG. 1 is a block diagram of clocking system for a memory in accordance with one embodiment of the invention.

FIG. 1 is a block diagram of clocking system 10 for a memory in accordance with one embodiment of the invention. The system 10 has an external clock 12. Note that the external clock 12 may have been conditioned. For instance, the external clock 12 may be a conditioned system clock. The conditioning may include adjusting the voltage levels of the system clock to produce a rail-to-rail external clock 12. The external clock 12 is coupled to an input of the clock shaper 14. In one embodiment, the clock shaper 14 is a programmable clock duty cycle control block. The output of the clock shaper 14 forms the access clock 16 that is coupled to a memory core 18. The output of the memory core 18 is coupled to a master 20 of a master slave output register 22. The master 20 is coupled to the slave 24 of the output register 22. The external clock 12 is coupled to an input of the first delay block 26. The output 28 of the first delay block forms the master clock 28 that is coupled to the master 20 of the output register 22. The external clock 12 is also coupled to an input of the second delay block 30. The output 32 of the second delay block 30 forms the slave clock 32 that is coupled to the slave 24 of the output register 22. In one embodiment, the second delay block is removed and the only delay is due to layout and routing. In another embodiment, the first and second delay blocks 26, 30 are programmable delays. The invention encompasses any type of circuit delays. The output of the output register 22 is sent out as the data out output 36 via the output driver and buffer block 34.

Figure 2:
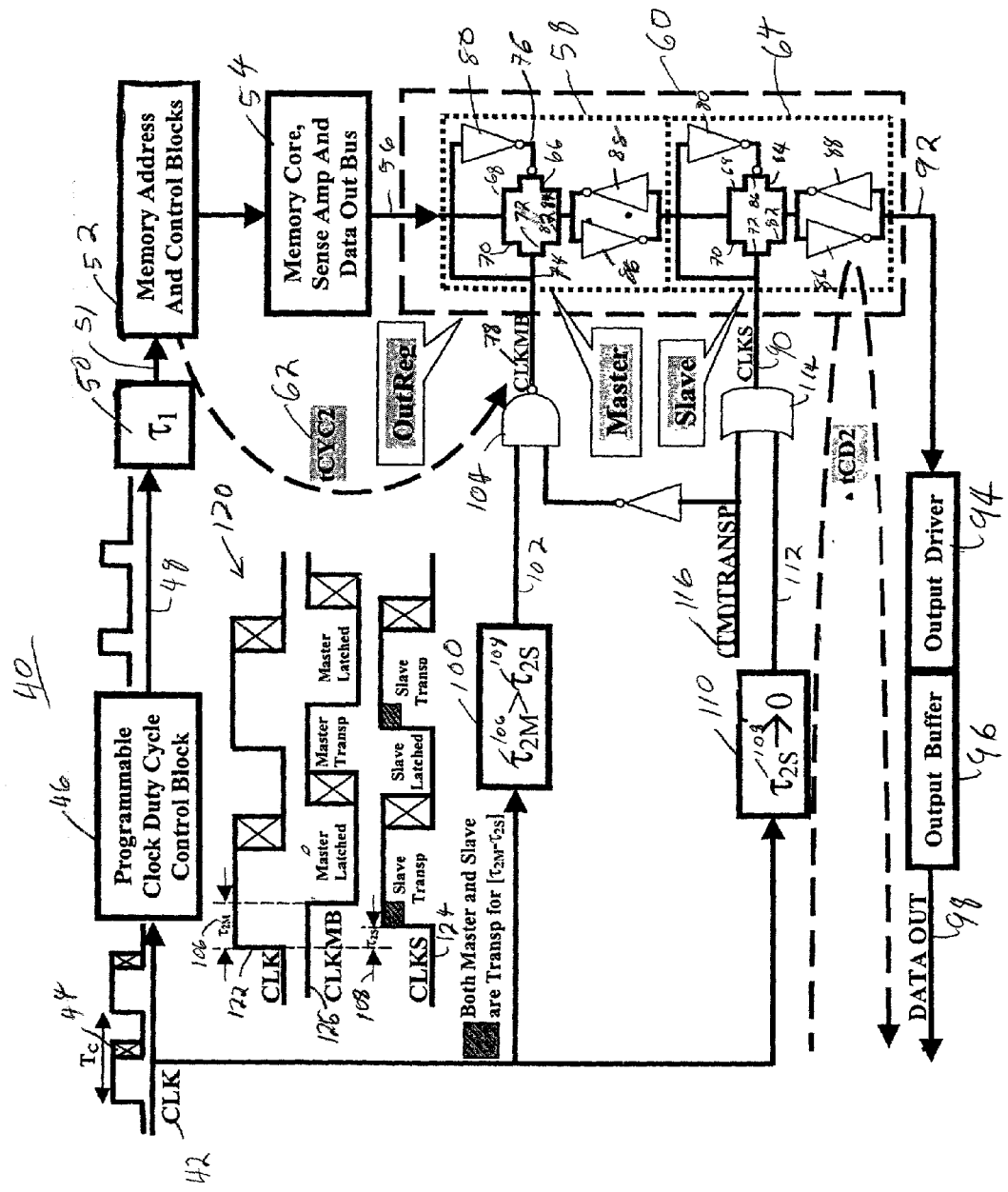
FIG. 2 is a more detailed block diagram of clocking system for a memory in accordance with one embodiment of the invention.

FIG. 2 is a block diagram of clocking system 40 for a memory in accordance with one embodiment of the invention. An external clock 42 has a period of $T_c$. The X 44 through a portion of the clock signal indicates that the clock may be high or low at this point. A programmable clock duty cycle control block 46 has an input connected to the external clock 42. The output 48 of the programmable clock duty cycle control block 46 is an access clock. The access clock 48 incurs a delay $\tau_1$ 50, becoming the delayed access clock 51. This delay 50 is generally the result of routing delays although it might also be a variable delay block. The delayed access clock 51 is coupled to the memory address and control blocks 52; in a particular implementation, the address and control signals are pulsed by the access clock. The memory address and control blocks 52 are coupled to a memory core, sense amplifier and data output bus block 54. The output 56 of the memory core 54 is coupled to a master portion 58 of an output register 60. The output register 60 is formed of a master 58 and a slave 64. The structure of the master 58 and the slave 64 are identical. A p-type transistor 66 has its drain 68 coupled to the output of the memory core 54. A source 70 of an n-type transistor 72 is also connected to the output of the memory core 54. The gate 74 of the n-type transistor 72 is coupled to the master clock 78. An inverter 80 is coupled between the master clock 78 and the gate 76. The time from the delayed access clock 51 belonging to the current clock cycle to the master clock 78 belonging the next clock cycle determines the cycle time (tCYC2) 62. The drain 82 of the n-type transistor 72 and the source 84 of the p-type transistor 66 are coupled to the input of the inverter 86, part of a pair of back to back inverters 86, 88: the output of one inverter 86 is connected to the input of the second inverter 88 and output of a second inverter 88 is connected to the input of the first inverter 86. The output of one inverter 86 is connected to the input of the second inverter 88 and output of a second inverter 88 is connected to the input of the first inverter 88. The slave section is the same except the gates are coupled to a slave clock 90. Note that slave components are labeled with the same reference numerals otherwise. The output 92 of the slave section 64 is coupled to an output driver 94. The output driver 94 is coupled to an output buffer 96. The output 98 of the output buffer 96 is the data out.

The external clock 42 is also coupled to an input of a first delay block 100. The output 102 of the first delay block 100 is coupled to a NAND gate (inverting logic gate) 104. The NAND gate 104 is only used for testing purposes. During normal operation the output 102 of the delay block 100 is merely inverted to become the master clock 78. Note that the first delay block shows a first delay ($\tau_{2m}$) 106 is greater than a second delay ($\tau_{2s}$) 108. This means the delay on the master clock is greater than the delay on the slave clock 90. As a result there is a period where both the master 58 and the slave 64 are transparent. The external clock 42 is also coupled to an input of a second delay block 110. The output 112 of the second delay block 110 is coupled to a NOR gate 114. The NOR gate 114 is only used for testing purposes. During normal operation the output 112 of the delay block 110 is the same as the slave clock 90. The NAND gate 104 and the NOR gate 114 are coupled to a test signal [(TM) TRANSP] 116. The clock-to-data valid time (tCD2) 118 is shown being determined by the delay between the external clock 42 and the appearance of the correct data at the output 98 (data out). The signal diagram 120 of the three clocks shows that the external clock 122 is ahead of the slave clock 124 by the second delay 108. In one embodiment, the second delay is set to that delay incurred in routing the clock to the slave portion 64 of the output register 60. The master clock 126 is delayed by a first delay 106 with regard to the external clock 122. The transparency period is the difference between the first delay 106 and the second delay 108.

Figure 3:
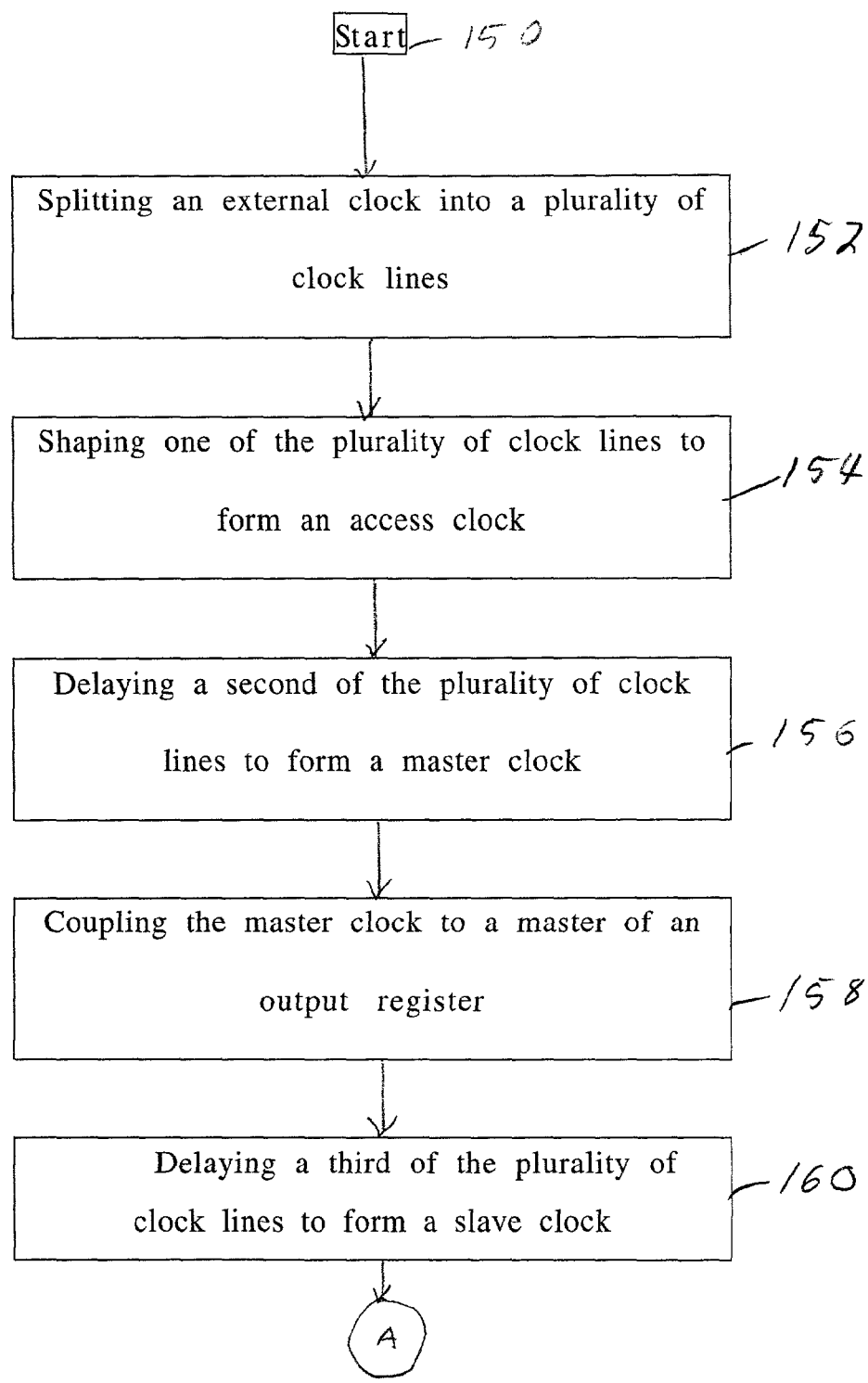
FIGS. 3 & 4 are a flow chart of the steps used in a clocking method for a memory in accordance with one embodiment of the invention.
Figure 4:
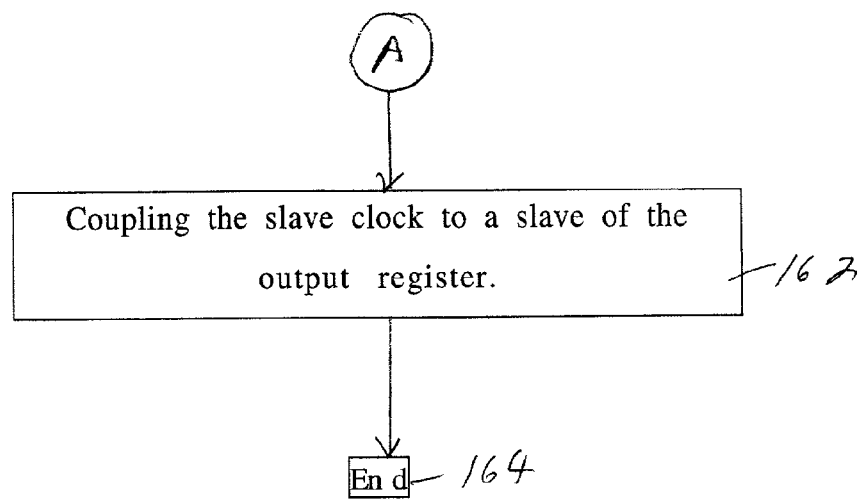

FIGS. 3 & 4 are a flowchart of the steps used in a clocking method for a memory in accordance with one embodiment of the invention. The process starts, step 150, by splitting the external clock into a plurality of clock lines at step 152. One of the plurality of clock lines is shaped to form an access clock at step 154. A second of the plurality of clock lines is delayed to form the master clock at step 156. The master clock is coupled to a master of an output register at step 158. A third of the plurality of clock lines is delayed to form a slave clock at step 160. At step 162, the slave clock is coupled to a slave of the output register which ends the process at step 164. In one embodiment an outside clock is shaped to form the external clock. In another embodiment, the desired delay of the second the plurality of clock lines is determined. In another embodiment, it is determined if a minimum clock-to-data time is desired. When the minimum clock-to-data time is desired, a slave delay is set to a minimum. Next, the minimum attainable clock-to-data valid time is determined, by using a fast process device. The obtained minimum value determines the maximum clock speed; this will be detailed later, in connection to FIG. 5. A clock-to-data margin at a slow corner is determined. A master delay is increased by the clock-to-data margin. Note that slow corner means a slow process (i.e., a slow p-type transistor and a slow n-type transistor) under slow conditions (generally at the highest operating voltage and temperature, generally).

Figure 5:
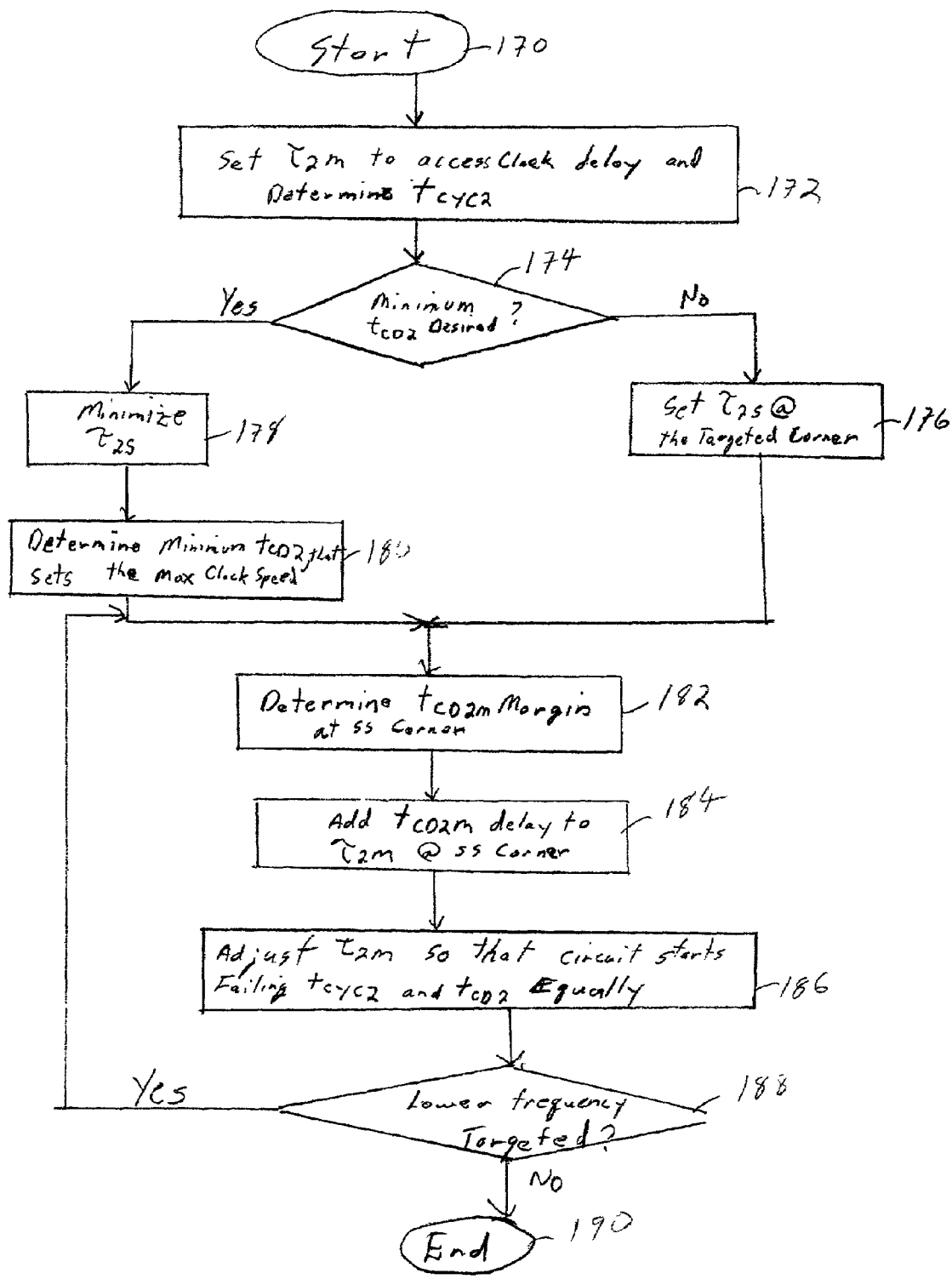
FIG. 5 is a flow chart of the clock delay adjustment steps used in a clocking method for a memory in accordance with one embodiment of the invention.

FIG. 5 is a flow chart of the clock delay adjustment steps used in a clocking method for a memory in accordance with one embodiment of the invention. The process starts, step 170, by setting the master delay ($\tau_{2m}$) such that approximately equal delays are obtained between the external clock 42 and the delayed access clock 51 as well as the master clock 78. By running simulations at the fast, typical and slow corners, the corresponding cycle time (tCYC2) distribution is determined at step 172. Next it is determined if a minimum clock-to-data valid time (tCD2) is desired, at step 174. When the minimum clock-to-data valid time (tCD2) is not desired, the slave delay ($\tau_{2s}$) is set to meet the desired clock-to-data valid time (tCD2) at the targeted corner, generally the fast or typical corner, at step 176. When the minimum clock-to-data valid time (tCD2) is desired, the slave delay ($\tau_{2s}$) is set to a minimum at step 178. This minimum is generally set by the chosen layout (the block placement and the routing involved). At step 180 the minimum clock-to-data valid time (tCD2) is determined (simulated at the targeted, fast or typical, corner); then, from simulations correlated with the market-acceptable data sheet inter-relation between, and from the data sheet correlation between the tCD2 and the tCYC2, the maximum clock speed is set. Next the clock-to-data-valid margin (tCD2M) available at the slow corner is determined at step 182. At step 184 a clock-to-data-valid margin (tCD2M) delay is added to the master delay ($\tau_{2m}$) at the slow corner. The master delay ($\tau_{2m}$) is then adjusted so that the circuit starts to fail the cycle time (tCYC2) requirements and the clock-to-data valid time (tCD2) requirements equally at step 186. It is very important to notice that tCYC2 varies much more over corners than tCD2. The later being determined by a much shorter path, its spread over corners is much smaller. Hence, step 184 is very effective in improving the tCYC2 prime bin distribution, because many more slow devices can input correct data to the master section of the output register within the prime bin tCYC2 specification, now that the master clock is delayed. Concerning step 186, it should be noted that the larger that $\tau_{2m}$ is, the later can data can transition at the input of the master section of the output register, and the larger tCD2 will be because of the newly introduced output register flow through mode. At step 188 it is determined if a lower clock frequency is targeted. When a lower frequency is targeted, a new, larger, clock-to-data-valid margin (tCD2M) is determined at step 182. When a lower frequency is not targeted, the process ends at step 190. The described method and apparatus not only allows a semi-independent setting of the clock-to-data valid time (tCD2) from the cycle time (tCYC2), but it also allows a much improved prime bin speed (tCYC2) distribution for the memory. As a result, the described solution allows manufacturers to set a semiconductor memory for its highest performance and highest profit margin.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. For instance, the testing circuitry 104, 114, 116 may be eliminated with proper replacement of the NAND 104 with an inverter. Accordingly, it is intended to embrace all such alterations, modifications, and variations in the appended claims.

What is claimed is:

1. A clocking system for a memory, comprising:
   an external clock;
   a clock shaper having an input coupled to the external clock and an access clock at an output, the access clock clocking the memory;
   a first delay block having an input coupled to the external clock and an output coupled to a master of an output register;
   a slave of the output register coupled to the external clock; and
   a second delay block having an input coupled to the external clock and an output coupled to the slave of the output register.

2. The system of claim 1, wherein a first delay by the first delay block is not equal to a second delay by the second delay block.

3. The system of claim 2, wherein the first delay is greater than the second delay.

4. The system of claim 1, further including a logic inversion stage coupled between the output of the first delay block and the master of the output register.

5. The system of claim 1, wherein the clock shaper is a programmable clock duty cycle control block.

6. The system of claim 1, wherein the first delay block has a programmable delay.

7. The system of claim 1, wherein the second delay block has a programmable delay.

8. A method of operating a clocking system for a memory, comprising the steps of:
   a) splitting an external clock into a plurality of clock lines;
   b) shaping one of the plurality of clock lines to form an access clock;
   c) delaying a second of the plurality of clock lines to form a master clock;
   d) coupling the master clock to a master of an output register;
   e) delaying a third of the plurality of clock lines to form a slave clock; and
   f) coupling the slave clock to a slave of the output register.

9. The method of claim 8, wherein step (a) further includes the step of:
   a1) shaping an outside clock to form the external clock.

10. The method of claim 8, wherein step (c) further includes the step of:
    c1) determining a desired delay for the second of the plurality of clock lines.

11. The method of claim 8, wherein step (f) further includes the steps of:
    f1) determining if a minimum clock-to-data valid time is desired;
    f2) when the minimum clock-to-data valid time is desired, setting a slave delay to a minimum.

12. The method of claim 11, further including the steps of:
    f3) determining a minimum clock-to-data valid time;
    f4) setting a clock speed to a maximum clock speed.

13. The method of claim 12, further including the steps of:
    f5) determining a clock-to-data margin at a slow corner;
    f6) increasing a master delay by the clock-to-data margin.

14. The method of claim 13, further including the step of:
    f7) adjusting the master delay to provide an equal failure rate for a required clock-to-data time and a required cycle time.

* * * * *